United States Patent [19]
Fuss et al.

[11] Patent Number: 4,919,643
[45] Date of Patent: Apr. 24, 1990

[54] DEVICE FOR SETTING A GEAR RATIO IN A CONTINUALLY VARIABLE BELT-DRIVE TRANSMISSION

[75] Inventors: Josef Fuss, Elsdorf; Gerd Adams, Leichlingen, both of Fed. Rep. of Germany

[73] Assignee: Ford Motor Company, Dearborn, Mich.

[21] Appl. No.: 290,338

[22] Filed: Dec. 27, 1988

[30] Foreign Application Priority Data

May 13, 1988 [DE] Fed. Rep. of Germany ....... 3816357

[51] Int. Cl.$^5$ .............................................. F16H 55/56
[52] U.S. Cl. ...................................................... 474/46
[58] Field of Search ................... 474/8, 11, 12, 17, 18, 474/28, 46; 74/867–869

[56] References Cited

U.S. PATENT DOCUMENTS

| | | | |
|---|---|---|---|
| 4,345,664 | 8/1982 | Anno et al. | 474/46 X |
| 4,427,402 | 1/1984 | Steinhofer | 474/46 X |
| 4,617,004 | 10/1986 | Mott | 474/8 |

FOREIGN PATENT DOCUMENTS

| | | |
|---|---|---|
| 2948195 | 6/1980 | Fed. Rep. of Germany. |
| 3117657 | 3/1983 | Fed. Rep. of Germany. |
| 3241789 | 8/1985 | Fed. Rep. of Germany. |
| 1200668 | 7/1970 | United Kingdom. |

Primary Examiner—Thuy M. Bui
Attorney, Agent, or Firm—Frank G. McKenzie; Donald J. Harrington

[57] ABSTRACT

A continually variable cone-pulley, belt-drive transmission includes a primary shaft having a cone-pulley arrangement actuated by a pressure servo, a secondary shaft driven by an endless belt having a cone-pulley, actuated by a second pressure servo. Spring assemblies located in the pressure servo preload compression springs. Each spring assembly includes a compression spring located in spring-receiving rings, a cup-shaped support ring, and a guide ring comprising a peg-shaped spring guide. Preload on the compression springs is released during the first complete movement of the cone-pulley assembly by loading a locking and unlocking pin.

8 Claims, 6 Drawing Sheets

DEVICE FOR SETTING A GEAR RATIO IN A CONTINUALLY VARIABLE BELT-DRIVE TRANSMISSION

BACKGROUND OF THE INVENTION

1. Field of the Invention

This invention relates to the field of continually variable cone-pulley, belt-drive transmissions, particularly to a spring loaded device for moving pulleys on primary and secondary shafts.

2. Description of the Prior Art

The continually variable belt-drive transmission described in British Pat. No. 1,200,668 includes a primary shaft supporting a stationary cone-pulley and an axially displaceable cone-pulley, and a secondary shaft driven by an endless drive belt from the first shaft supporting stationary and axially displaceable cone-pulleys. The movable cone-pulleys include cylinder jackets and piston discs secured to the corresponding shafts to form pressure fluid servos for hydraulic displacement of the movable pulleys. One spring assembly located in each servo applies a minimum preload to the drive belt. A similar transmission, described in German Offenlegungsschrift No. 29 48 195, includes a spring assembly located in the fluid Pressure servos wherein the spring assembly includes a large Belleville spring.

These transmissions have the disadvantage that axial displacement of the pulley caused by action of the spring is only a very short distance because of the short path of travel of the spring. As a result, the control range of the transmission is unacceptably small. When a helical compression spring of large size is provided, the magnitude of the preload developed in the spring is too small to permit a motor vehicle to be driven by a continually variable transmission.

A continually variable transmission described in German Offenlegungsschrift No. 31 17 657 includes a spring located in the pressure fluid servo located on the secondary shaft, but no spring is present in the pressure fluid servo of the primary shaft. Assembly of the drive belt and the sun gear forming the input member would be impossible to complete in mass production if spring-actuated pressure fluid servos were included on both the primary and secondary shafts.

SUMMARY OF THE INVENTION

An object of the invention is to improve continually variable belt-drive transmissions so that both the pressure fluid servos for the primary shaft and secondary shaft are provided with spring assemblies, which can exert such large preloading that a motor vehicle can be moved with the engine operating at idle. Further, the improvement facilitates, rather than impedes, assembly of the drive belt and servos.

These objects are realized in a transmission according to the invention because each spring arrangement includes multiple small helical compression springs fitted into the pressure fluid servos in an assembled position and preloaded in spring receiving rings. A cup-shaped support ring includes receiving surfaces directed toward the servo piston and peg-shaped spring guides facing the corresponding displaceable pulley and located on a guide ring. The preload produced at assembly in the helical compression springs is relieved during the first complete axial pulley movement by suitably constructed locking and unlocking pins, which maintain spring preload until pressed by the servo past a stop surface on the guide ring and thereafter release the preload. The desired magnitude of spring preload results without rendering assembly of the transmission, drive belt, and sun gear difficult.

Because of the form of the springs of this invention, an acceptable axial stroke of the movable pulleys is possible so that the range of control is not limited.

BRIEF DESCRIPTION OF THE DRAWINGS

The invention is explained in greater detail with reference to embodiments, in which.

DESCRIPTION OF THE PREFERRED EMBODIMENT

Figure 1:
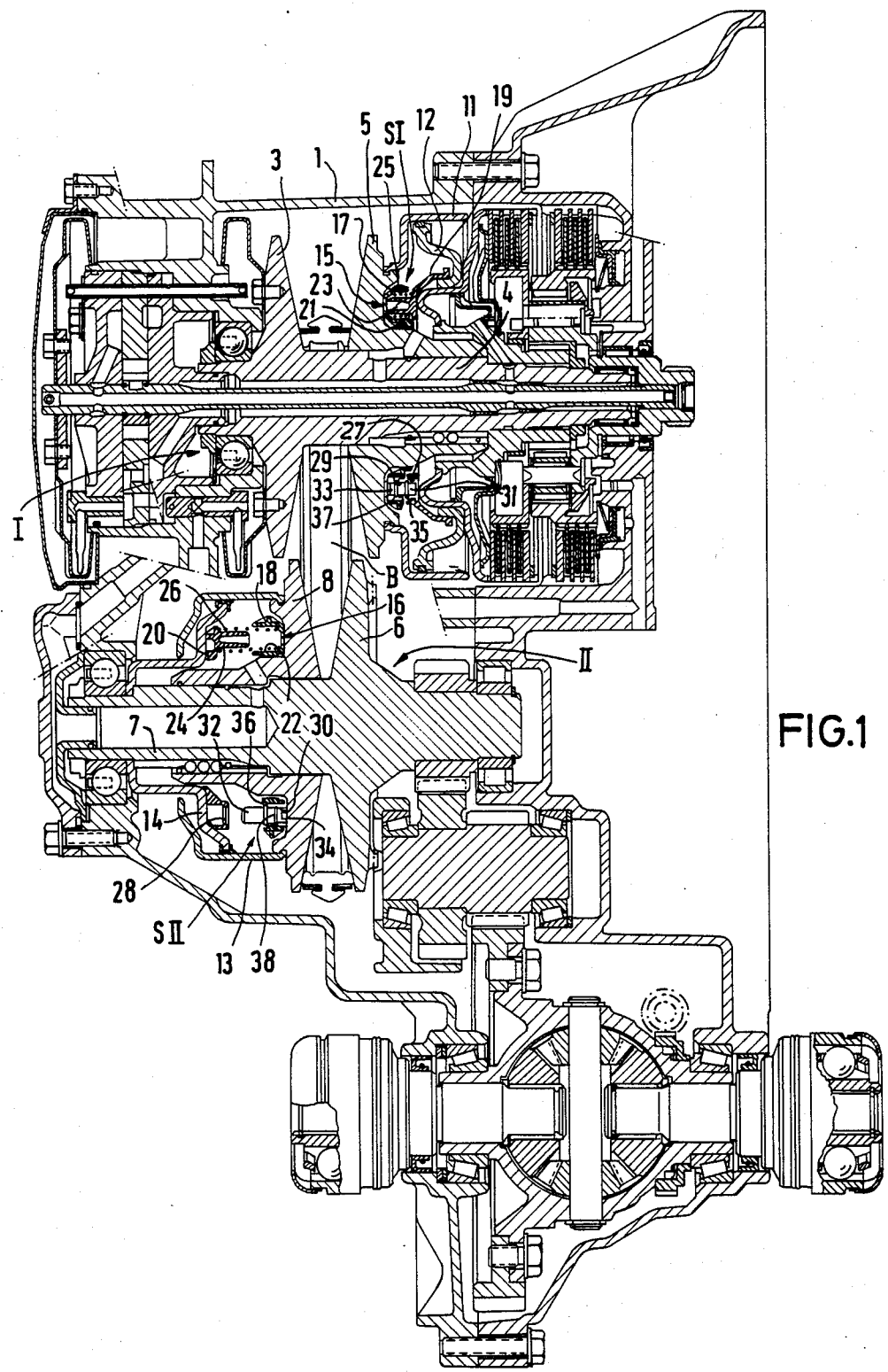
FIG. 1 is a longitudinal cross section through a continually variable cone-pulley, belt-drive transmission containing the spring arrangements according to the present invention located in pressurized fluid servos.

The continually variable transmission shown in FIG. 1 includes a transmission housing 1, in which cone-pulley assemblies, mounted rotatably rigidly on a primary shaft I, are driveably connected by the circulating belt B to a cone-pulley assembly mounted rotatably rigidly on a secondary shaft II. The primary shaft comprises an axially stationary fixed cone-pulley 3, formed integrally with the primary shaft, and a movable cone-pulley 5, which is axially displaceable along an extension 4 of the primary shaft in accordance with the pressurized or vented state of a fluid servo SI.

Movable cone-pulley 5 is connected to cylinder jacket 11, which operates with piston disc 12 secured to the shaft extension to form pressure fluid servo SI.

Movable cone-pulley 8 of the secondary shaft is connected in a similar manner to cylinder jacket 13, which cooperates with piston disc 14 to form pressure fluid servo SII.

A spring receiving ring assembly 15 is located in pressure fluid servo SI, and a spring receiving ring assembly 16 is located in pressure fluid servo SII. Each of the two spring receiving assemblies comprises a support ring 17 and 18 seated on the cylinder or pulley 5, 8 of the corresponding servo, and a guide ring 19 and 20 seated on the piston disc 12, 14. The support rings include cup-like spring receiving rings 21 and 22. Guide rings 19 and 20 include peg-shaped spring guides 23, 24 on whose outer surfaces are located individual helical compression springs 25 and 26.

Figure 2:
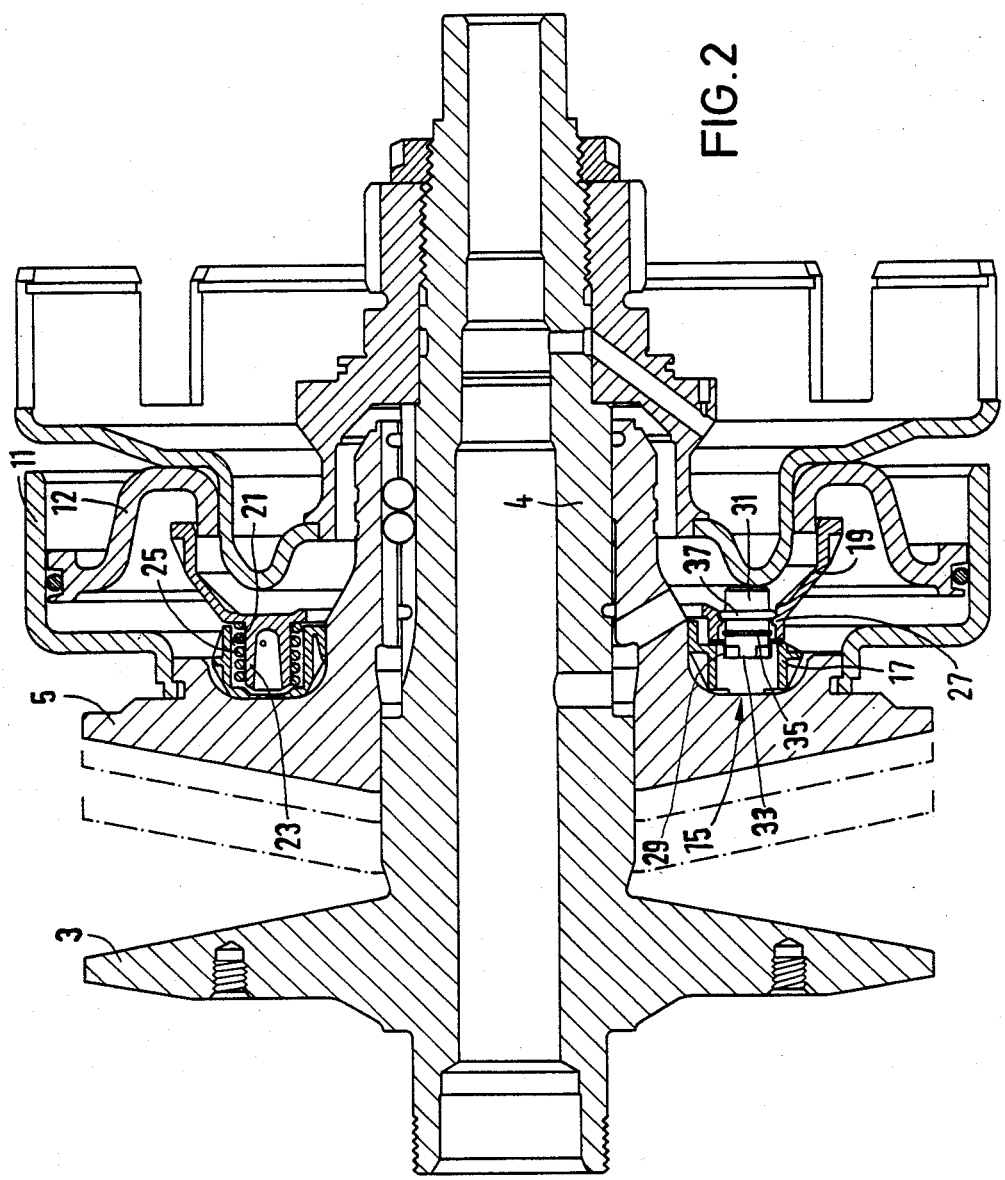
FIG. 2 is a partial cross section through a cone-pulley and a pressurized fluid servo associated with a primary shaft of the transmission of FIG. 1. Above the axis of the shaft, compression springs in the assembled position are shown, below the axis, a locking pin is shown.
Figure 3:
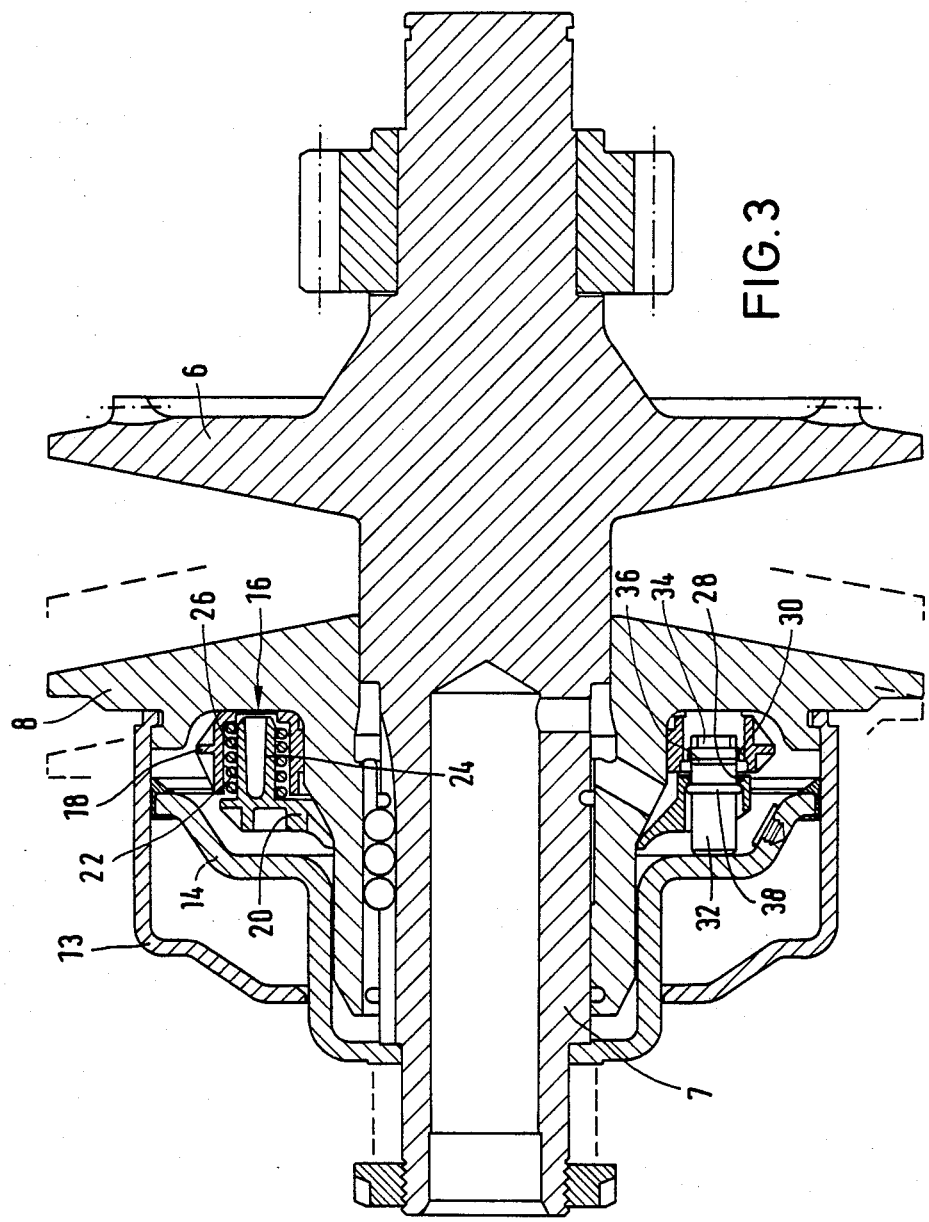
FIG. 3 is a partial cross section through a cone-pulley and fluid servo associated with the secondary shaft of the transmission of FIG. 1. Above the axis of the shaft, a compression spring is shown in the assembled position; below the axis, a locking pin is shown.
Figure 4:
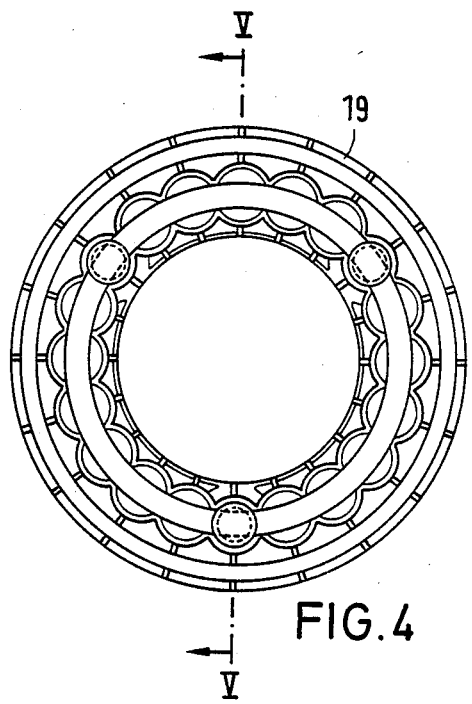
FIG. 4 is a front elevation view of the spring and receiving ring arrangement for the primary shaft.
Figure 5:
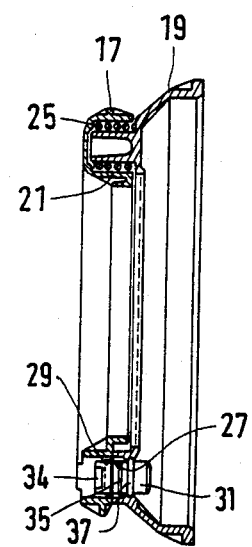
FIG. 5 is a cross section taken in plane V—V in FIG. 4.
Figure 6:
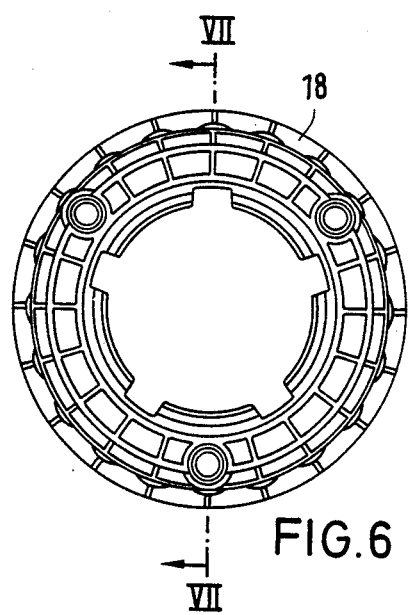
FIG. 6 is a front elevation of the spring receiving ring arrangement for the secondary shaft.
Figure 7:
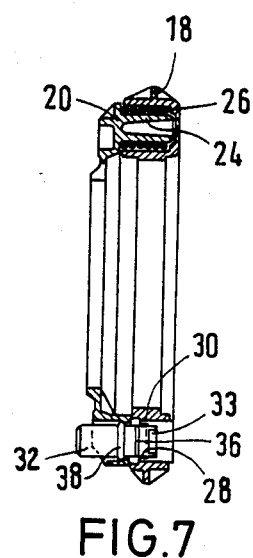
FIG. 7 is a cross section taken at plane VII—VII in FIG. 6.

As shown in the lower half of the cross sections of FIGS. 2 and 3, located at three locations distributed angularly about the axes of the primary and secondary shafts, suitable catch openings 27 and 28, and holding openings 29 and 30 for locking and unlocking pins 31 and 32 are provided instead of the spring-receiving rings and spring guides for the helical compression springs. Each pin is provided at one of its ends with a bayonet head 33, 34, and approximately at its midpoint with a catch bead 35, 36 and holding bead 37, 38.

In FIG. 1, both spring receiving ring assemblies are shown in their operating position, i.e., the preload of the helical compression springs present in the assembled state has already been relaxed; primary shaft I has a nearly fully opened cone-pulley arrangement and secondary shaft II has a nearly closed cone-pulley arrangement.

In the primary shaft pulley assembly shown in FIG. 2, movable cone-pulley 5 is supported on the extension 4 of the first cone-pulley 3 in the assembled position, i.e., spring receiving ring arrangement 15 is assembled in the locked state of its two rings, support ring 17 and guide ring 19. Piston disc 12 fixes the position of pin 31 and forces holding bead 37 against catch opening 27 while springs 25 force rings 17 and 19 apart. In this way, the preloaded compression springs are held with their coils nearly closed.

In the secondary shaft unit shown in FIG. 3, movable cone-pulley 8, shown in the assembled position, is supported on extension 7 of the fixed cone-pulley 6. Spring receiving ring 16 is engaged in its preloaded assembled state. Pin 32 engages with its catch bead 36 behind the catch opening 28 and holds compression springs 26 almost fully closed.

When the assembled continually variable transmission is put into operation for the first time, each of the two cone-pulley assemblies on the primary shaft and secondary shaft pass through positions of displacement at the extremities of their travel. When the cone-pulley assemblies are in their maximum open position, pins 31, 32 contact stationary pistons 12, 14 and are forceably pressed by the pistons through catch openings 27, 28. Then the pins pass catch beads 35, 36 into the corresponding holding openings 29, 30 where the pins are held and retained thereafter. After the pins become held, compression springs 25, 26 can expand or contract as operating conditions require.

Further details of the two spring receiving assemblies 15, 16 for the primary and secondary shafts are shown in elevation views and cross sections in FIGS. 4-7.

Figure 8:
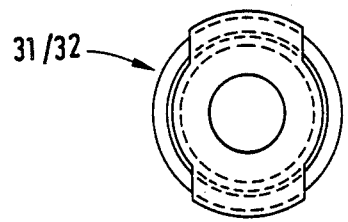
FIG. 8 is a front elevation view of the locking pin for the spring, receiving rings.
Figure 9:
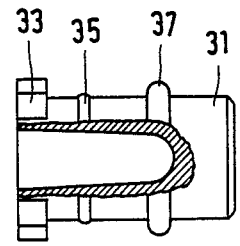
FIGS. 9 and 10 are lateral views of corresponding locking pins of FIG. 8.
Figure 10:
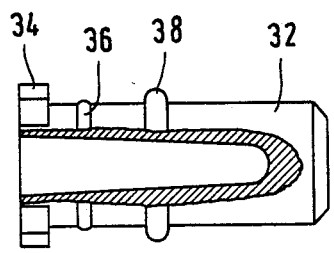

Details of the pin used in the primary and secondary shaft are shown to a larger scale than elsewhere in front and side elevation views shown in FIGS. 8-10.

Figure 11A:
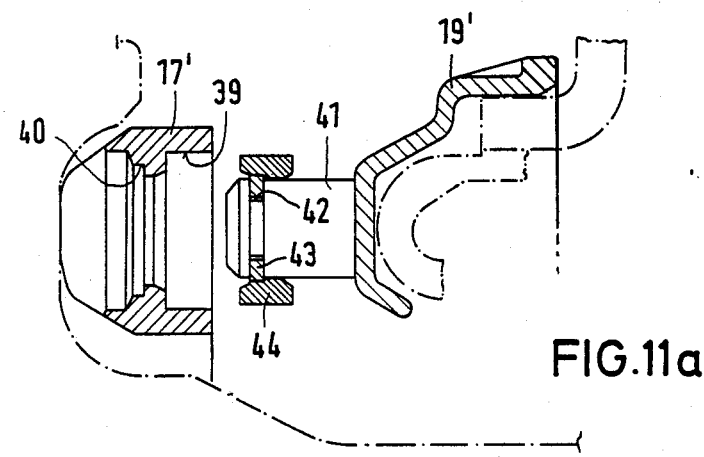
FIGS. 11a–11c show, at various stages of assembly, an alternate embodiment of the locking arrangement according to this invention.
Figure 11B:
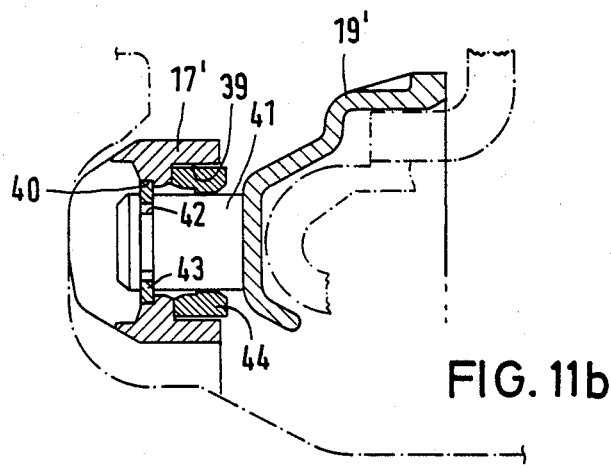
Figure 11C:
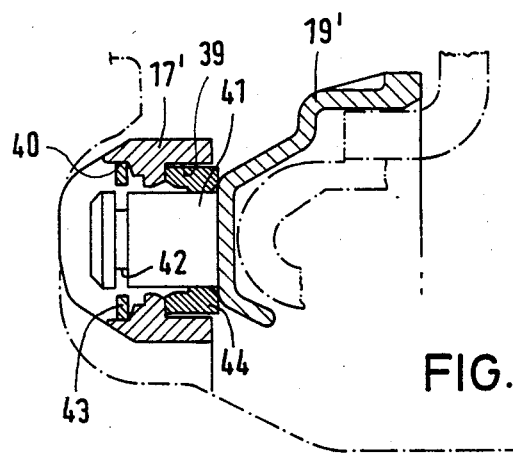

Another form of the locking arrangement according to this invention is shown in FIGS. 11a-11c. Holdings and catch openings 39, 40 are formed on the interior surface of cylindrical support rings 17'. Locking pins 41, on which outwardly springing circlips 43 are held by sleeves 44 in the spring loaded state in the angular grooves 42, are formed integrally on a guide ring 19' adjacent the piston. To obtain the locked assembled position of the support ring 17' with guide ring 19', locking pins 41 are pushed into the holding openings 39 far enough so that circlips 42 engage in rear catch openings 40, so that they secure locking pins 41 on the support rings 17'. After the transmission has been assembled and the pulley moves through the extremities of its travel, locking pins 41 are pushed further within support ring 17' until the circlip releases locking pin 41. In this way, the helical spring assembly is ready for operation.

When the transmission is required to operate without a pressurized fluid supplied to the servos, the springs force the belt-pulley assembly to the 1:1 gear ratio position. When this occurs, no wear occurs on the thrust member belt or the cone-pulleys because the belt runs on both cone-pulleys with a substantial angle of belt contact. Thus, a relatively high contact force is ensured. Also, the primary cone-pulley runs at moderate to low speed.

Having described a preferred embodiment of our invention, what we claim and desire to secure by U.S. Letters Patent is:

1. In a continuously variable transmission adapted to produce stepless gear ratios between its input and output, a device for setting a predetermined gear ratio, comprising:

a first shaft mounted for rotation, supporting a pulley fixed to said shaft and a pulley axially displaceable thereon;

servo means, including a piston for moving the displaceable pulley with respect to the fixed pulley;

spring means for biasing the displaceable pulley toward the associated fixed pulley;

means responsive to the position of the servo means piston for preventing the spring means from moving the displaceable pulley and for releasing the spring means to move the displaceable pulley.

2. The device of claim 1 wherein the preventing and releasing means comprises:

support means biased by the spring means into contact with the displaceable pulley, defining a first holding surface thereon;

a guide means biased by the spring means away from the displaceable pulley, defining a first catch surface thereon;

a pin having a second catch surface and a second holding surface thereon, the second catch surface biased by the spring means into contact with the first catch surface while the device is in an assembled condition, the second holding surface engaging the first holding surface after the second catch surface clears the first catch surface while the device is in an operating condition.

3. The device of claim 2 wherein the guide means includes a guide ring having spring guides spaced mutually about the first shaft, each spring guide adapted to hold a coiled helical spring thereon, further comprising means for holding the pin fixed against displacement while the device is in the assembled condition.

4. The device of claim 1 wherein the preventing and releasing means comprises:

guide means biased by the spring means away from the displaceable pulley;

a pin adapted to contact the associated guide means and having a recess therein;

a sleeve surrounding the pin;

a circlip engageable in the recess, adapted to connect the pin and sleeve;

support means having a passage therethrough, biased by the spring means into contact with the displaceable pulley including
  a holding surface located in the passage adapted to receive the sleeve therein and to block movement of the support means relative to the sleeve and to permit movement of the support means relative to the pin;
  a catch surface located in the passage spaced along the direction of movement of the displaceable pulleys from the holding surface and spaced radially from the recess, adapted to receive the circlip therein after the circlip disengages the sleeve; and
  a second recess located in the passage and spaced from the catch surface, adapted to receive the circlip therein after the recess passes the catch surface.

5. In a continuously variable transmission adapted to produce stepless gear ratios between its input and output, a device for setting a predetermined gear ratio, comprising:
  a first shaft mounted for rotation, supporting a pulley fixed to said shaft and a pulley axially displaceable thereon;
  a second shaft rotatably mounted parallel to the first shaft, supporting a pulley fixed to said shaft and a pulley axially displaceable thereon;
  an endless drive belt driveably engaging the pulleys of the first and second shafts at variable radial distances from the axes of the respective associated shafts, said distances depending on the position of the displaceable pulleys, and setting the gear ratio at which the transmission operates;
  servo means including a piston for moving the displaceable pulleys along the axes of the shafts on which they are supported;
  spring means for biasing the displaceable pulleys toward their associated fixed pulleys; and
  means responsive to the position of the servo means piston for preventing the spring means from moving the displaceable pulleys and releasing the spring means to move the displaceable pulleys.

6. The device of claim 5 wherein the preventing and releasing means comprises:
  support means located in the hydraulic servo means, biased by the spring means into contact with each associated displaceable pulley, defining a first holding surface thereon;
  guide means located in the hydraulic servo means, biased by the spring means away from the associated displaceable pulley, defining a first catch surface thereon for holding the springs in positions spaced mutually about the first shaft and second shaft; and
  a pin having a second catch surface and a second holding surface thereon, the second catch surface biased by the spring means into contact with the first catch surface while an device is in the assembled condition, the second holding surface engaging the first holding surface after the second catch surface clears the first catch surface while an device is in the operating condition.

7. The device of claim 6 wherein the guide means includes a guide ring having spring guides spaced mutually about the first shaft and second shaft, each spring guide adapted to hold a coiled helical spring thereon, further comprising means for holding the pin fixed against displacement while the device is in the assembled condition.

8. The device of claim 5 wherein the preventing and releasing means comprises:
  guide means biased by the spring means away from the associated displaceable pulley;
  a pin adapted to contact the associated guide means and having a recess therein;
  a sleeve surrounding the pin;
  a circlip engageable in the recess, adapted to connect the pin and sleeve;
  support means having a passage therethrough, biased by the spring means into contact with each associated displaceable pulley including
  a holding surface located in the passage adapted to receive the sleeve therein and to block movement of the support means relative to the sleeve and to permit movement of the support means relative to the pin;
  a catch surface located in the passage spaced along the direction of movement of the displaceable pulleys from the holding surface and spaced radially from the recess, adapted to receive the circlip therein after the circlip disengages the sleeve and while the device is in an assembled condition; and
  a second recess located in the passage and spaced from the catch surface, adapted to receive the circlip therein after the recess passes the catch surface and while an device is in the operating condition.

* * * * *